United States Patent
Lv et al.

(10) Patent No.: US 10,404,753 B2
(45) Date of Patent: Sep. 3, 2019

(54) METHOD AND APPARATUS FOR DETECTING SECURITY USING AN INDUSTRY INTERNET OPERATING SYSTEM

(71) Applicant: KYLAND TECHNOLOGY CO., LTD., Beijing (CN)

(72) Inventors: Zhiyong Lv, Beijing (CN); Weikang Guo, Beijing (CN); Minghao Tian, Beijing (CN)

(73) Assignee: KYLAND TECHNOLOGY CO., LTD., Beijing (CN)

(*) Notice: Subject to any disclaimer, the term of this patent is extended or adjusted under 35 U.S.C. 154(b) by 186 days.

(21) Appl. No.: 15/638,608

(22) Filed: Jun. 30, 2017

(65) Prior Publication Data

US 2018/0316728 A1    Nov. 1, 2018

(30) Foreign Application Priority Data

Feb. 9, 2017   (CN) .......................... 2017 1 0071598

(51) Int. Cl.
| | | |
|---|---|---|
| *H04L 29/00* | (2006.01) | |
| *H04L 29/06* | (2006.01) | |
| *G06Q 50/06* | (2012.01) | |
| *H04L 29/08* | (2006.01) | |

(52) U.S. Cl.
CPC ............. *H04L 63/20* (2013.01); *G06Q 50/06* (2013.01); *H04L 63/04* (2013.01); *H04L 63/10* (2013.01); *H04L 63/14* (2013.01); *H04L 63/1433* (2013.01); *G05B 2219/32404* (2013.01);

(Continued)

(58) Field of Classification Search
CPC ..... G07C 13/00; H04L 63/1416; H04L 63/20; H04L 61/1511; H04L 63/0227; H04L 63/0263; H04L 63/0281

See application file for complete search history.

(56) References Cited

U.S. PATENT DOCUMENTS

| | | |
|---|---|---|
| 2004/0107345 A1 | 6/2004 | Brandt et al. |
| 2013/0031037 A1 | 1/2013 | Brandt et al. |

(Continued)

FOREIGN PATENT DOCUMENTS

WO    2016058802 A1    4/2016

*Primary Examiner* — Ghazal B Shehni
(74) *Attorney, Agent, or Firm* — Arent Fox LLP; Michael Fainberg

(57) ABSTRACT

Disclosed area method and apparatus for detecting security using an industry internet operating system so as to address problems in the prior art of poor security of field devices, and high difficulty of manipulating the field devices. In the method, security detection rules corresponding to respective field devices are obtained according to various heterogeneous and dispersed operating data information in an industry field acquired in real-time into a database, in a big-data analysis mode of an industry big-data analysis platform, and some of the security detection rules corresponding to the field devices are selected and then issued to execution devices to detect the field devices for security to guarantee controllable security in the industry field. In this way, industry data can be acquired, parsed, stored, mined, optimized, and secured in the big-data analysis mode, so that an industry and the field devices can operate in a trusted operating environment.

14 Claims, 5 Drawing Sheets

(52) U.S. Cl.
CPC ........ *H04L 63/105* (2013.01); *H04L 63/1416* (2013.01); *H04L 63/1425* (2013.01); *H04L 67/12* (2013.01)

(56) References Cited

U.S. PATENT DOCUMENTS

2016/0359825 A1 12/2016 Chand et al.
2017/0187733 A1* 6/2017 Ahn .................... H04L 61/1511

\* cited by examiner

METHOD AND APPARATUS FOR DETECTING SECURITY USING AN INDUSTRY INTERNET OPERATING SYSTEM

CROSS-REFERENCE TO RELATED APPLICATION

This application claims priority of Chinese Patent Application No. 201710071598.7, filed on Feb. 9, 2017, which is hereby incorporated by reference in its entirety.

FIELD

The present invention relates to the field of industry internet operating systems, and particularly to a method and apparatus for detecting security using an industry internet operating system.

BACKGROUND

Typically an industry field is deployed with a large number of field devices, and data are transmitted and information is passed generally over a field bus among the respective field devices in the industry field so that the respective field devices coordinate with each other to thereby finish a corresponding service.

In the prior art, there has been absent so far a corresponding security guaranteeing measure to detect and guarantee the security of data transmission and information passing between the respective field devices, thus resulting in a potential significant hidden risk of security throughout the industry field. Moreover since there are different security guaranteeing mechanisms for the different field devices, some piece of data information may be legal to some field device but illegal to another field device, thus degrading the flexibility of manipulating the field devices, and increasing the difficulty of managing the field devices.

SUMMARY

Embodiments of the invention provide a method and apparatus for detecting security using an industry internet operating system so as to address the problems in the prior art of poor security of field devices, and high difficulty of manipulating the field devices.

Particular technical solutions according to the embodiments of the invention are as follows:

An embodiment of the invention provides a method for detecting security using an industry internet operating system, the method includes:

obtaining operating data information of respective field devices in a specified period of time respectively, and extracting characteristic data information of the respective field devices in the specified period of time from obtained operating data information corresponding respectively to the respective field devices;

obtaining respective security detecting rules corresponding to the respective field devices according to obtained characteristic data information of the corresponding field devices in the specified period of time;

determining respective target security detection rules corresponding to the respective field devices, and execution devices corresponding to the respective target security detection rules according to the obtained respective security detection rules corresponding respectively to the respective field devices; and issuing the respective determined target security detection rules respectively to the corresponding execution devices, so that the respective execution devices detect the corresponding field devices for security respectively under the received target security detection rules.

Preferably the extracting the characteristic data information of the respective field devices in the specified period of time from the obtained operating data information corresponding respectively to the respective field devices includes:

analyzing the operating data information corresponding to the respective field devices respectively to obtaining respective dimensions corresponding to the field devices, and determining operating events in the respective dimensions, and association relationships among the operating events in the respective dimensions; and determining the obtained operating events in the respective dimensions corresponding to the respective field devices, and the association relationships among the operating events in the respective dimensions respectively as the characteristic data information of the corresponding field devices in the specified period of time.

Preferably the obtaining the respective security detecting rules corresponding to the respective field devices according to the obtained characteristic data information of the corresponding field devices in the specified period of time includes:

determining the characteristic data information of the respective field devices in the specified period of time respectively as security detection criterions corresponding to the field devices, and describing the security detection criterions corresponding to the respective field devices respectively as the respective security detection rules corresponding to the respective field devices in a preset rule description pattern.

Preferably the determining the respective target security detection rules corresponding to the respective field devices, and the execution devices corresponding to the respective target security detection rules according to the obtained respective security detection rules corresponding to the respective field devices includes:

outputting a selection interface on which there are displayed at least the obtained respective security detection rules corresponding to the respective field devices, and identifiers of the respective execution devices corresponding to the respective field devices, and obtaining the respective target security detection rules corresponding to the respective field devices, and the execution devices corresponding to the respective target security detection rules according to detected selection operations performed on the selection interface; or selecting the respective target security detection rules corresponding to each field device from the obtained respective security detection rules corresponding to the field device under a preset rule selection condition, and allocating the execution devices respectively for the respective selected target security detection rules in a preset execution device allocation scheme.

Preferably the method further includes: if an externally imported security detection rule is received, then determining the externally imported security detection rule as a target security detection rule corresponding to a field device upon determining the field device and an execution device corresponding to the externally imported security detection rule, and issuing the target security detection rule to the execution device, so that the execution device detects the corresponding field device for security under the received target security detection rule.

An embodiment of the invention further provides an apparatus for detecting security using an industry internet operating system, the apparatus includes:

a data obtaining unit configured to obtain operating data information of respective field devices in a specified period of time respectively, and to extract characteristic data information of the respective field devices in the specified period of time from the obtained operating data information corresponding respectively to the respective field devices;

a rule generating unit configured to obtain respective security detecting rules corresponding to the respective field devices according to obtained characteristic data information of the corresponding field devices in the specified period of time;

a rule selecting unit configured to determine respective target security detection rules corresponding to the respective field devices, and execution devices corresponding to the respective target security detection rules according to the obtained respective security detection rules corresponding to the respective field devices; and a rule issuing unit configured to issue respective determined target security detection rules respectively to the execution devices, so that the execution devices detect the corresponding field devices for security respectively under received target security detection rules.

Preferably the data obtaining unit is configured to extract characteristic data information of the respective field devices in the specified period of time from the obtained operating data information corresponding respectively to the respective field devices by:

analyzing the operating data information corresponding to the respective field devices respectively for respective dimensions corresponding to the field devices, and determining operating events in the respective dimensions, and association relationships among the operating events in the respective dimensions; and determining obtained operating events in the respective dimensions corresponding to the respective field devices, and the association relationships among the operating events in the respective dimensions respectively as the characteristic data information of the corresponding field devices in the specified period of time.

Preferably the rule generating unit is configured to obtain the respective security detecting rules corresponding to the respective field devices according to the obtained characteristic data information of the corresponding field devices in the specified period of time by:

determining the characteristic data information of the respective field devices in the specified period of time respectively as security detection criterions corresponding to the field devices, and describing the security detection criterions corresponding to the respective field devices respectively as the security detection rules corresponding to the respective field devices in a preset rule description pattern.

Preferably the rule selecting unit is configured to determine the respective target security detection rules corresponding to the respective field devices, and the execution devices corresponding to the respective target security detection rules according to the obtained respective security detection rules corresponding to the respective field devices by:

outputting a selection interface on which there are displayed at least the obtained respective security detection rules corresponding to the respective field devices, and identifiers of the respective execution devices corresponding to the respective field devices, and obtaining the respective target security detection rules corresponding to the respective field devices, and the execution devices corresponding to the respective target security detection rules according to detected selection operations performed on the selection interface; or selecting the respective target security detection rules corresponding to each field device from the obtained respective security detection rules corresponding to the corresponding field device under a preset rule selection condition, and allocating the corresponding execution devices respectively for the respective selected target security detection rules in a preset execution device allocation scheme.

Preferably the rule issuing unit is further configured, if an externally imported security detection rule is received, to determine the externally imported security detection rule as a target security detection rule corresponding to a field device upon determining the field device and an execution device corresponding to the externally imported security detection rule, and to issue the target security detection rule to the execution device, so that the execution device detects the corresponding field device for security under the received target security detection rule.

An embodiment of the invention further provides a non-volatile computer storage medium storing thereon computer executable instructions configured:

to obtain operating data information of respective field devices in a specified period of time respectively, and to extract characteristic data information of the respective field devices in the specified period of time from obtained operating data information corresponding respectively to the respective field devices;

to obtain respective security detecting rules corresponding to the respective field devices according to obtained characteristic data information of the corresponding field devices in the specified period of time;

to determine respective target security detection rules corresponding to the respective field devices, and execution devices corresponding to the respective target security detection rules according to the obtained respective security detection rules corresponding to the respective field devices; and to issue the respective determined target security detection rules respectively to the corresponding execution devices, so that the respective execution devices detect the corresponding field devices for security respectively under the received target security detection rules.

Preferably the computer executable instructions are configured to extract characteristic data information of the respective field devices in the specified period of time from the obtained operating data information corresponding to the respective field devices for the characteristic data information of the respective field devices in the specified period of time by:

analyzing the operating data information corresponding to the respective field devices respectively for respective dimensions corresponding to the corresponding field devices, and determining operating events in the respective dimensions, and association relationships among the operating events in the respective dimensions; and determining the obtained operating events in the respective dimensions corresponding to the respective field devices, and the association relationships among the operating events in the respective dimensions respectively as the characteristic data information of the corresponding field devices in the specified period of time.

Preferably the computer executable instructions are configured to obtain the respective security detecting rules corresponding to the respective field devices according to the obtained characteristic data information of the corresponding field devices in the specified period of time by:

determining the characteristic data information of the respective field devices in the specified period of time respectively as security detection criterions corresponding to the corresponding field devices, and describing the security detection criterions corresponding to the respective field devices respectively as the respective security detection rules corresponding to the respective field devices in a preset rule description pattern.

Preferably the computer executable instructions are configured to determine the respective target security detection rules corresponding to the respective field devices, and the execution devices corresponding to the respective target security detection rules according to the obtained respective security detection rules corresponding to the respective field devices by:

outputting a selection interface on which there are displayed at least the obtained respective security detection rules corresponding to the respective field devices, and identifiers of the respective execution devices corresponding to the respective field devices, and obtaining the respective target security detection rules corresponding to the respective field devices, and the execution devices corresponding to the respective target security detection rules according to detected selection operations performed on the selection interface; or selecting the respective target security detection rules corresponding to each field device from the obtained respective security detection rules corresponding to the corresponding field device under a preset rule selection condition, and allocating the corresponding execution devices respectively for the respective selected target security detection rules in a preset execution device allocation scheme.

Preferably the computer executable instructions are further configured, if an externally imported security detection rule is received, to determine the externally imported security detection rule as a target security detection rule corresponding to a field device upon determining the field device and an execution device corresponding to the externally imported security detection rule, and to issue the target security detection rule to the execution device, so that the execution device detects the corresponding field device for security under the received target security detection rule.

An embodiment of the invention further provides an electronic device including: a memory; and at least one processor, wherein:

the memory is configured to store instructions to be executed by the at least one processor; and the at least one processor is configured to execute the instructions stored in the memory: to obtain operating data information of respective field devices in a specified period of time respectively, and to extract characteristic data information of the respective field devices in the specified period of time from obtained operating data information corresponding to the respective field devices; to obtain respective security detecting rules corresponding to the respective field devices according to the obtained characteristic data information of the corresponding field devices in the specified period of time; to determine respective target security detection rules corresponding to the respective field devices, and execution devices corresponding to the respective target security detection rules according to the obtained respective security detection rules corresponding to the respective field devices; and to issue the respective determined target security detection rules respectively to the corresponding execution devices, so that the respective execution devices detect the corresponding field devices for security respectively under the received target security detection rules.

Preferably the electronic device further includes an input device and an output device, wherein the input device is configured to receive input data information, and to generate instruction information related to user setting and/or function control in the apparatus for detecting security using an industry internet operating system; and the output device includes at least one display device.

Preferably the memory, the processor, the input device, and the output device can be connected over a bus or otherwise.

Preferably the instructions are configured to extract characteristic data information of the respective field devices in the specified period of time from the obtained operating data information corresponding to the respective field devices by:

analyzing the operating data information corresponding to the respective field devices respectively for respective dimensions corresponding to the corresponding field devices, and determining operating events in the respective dimensions, and association relationships among the operating events in the respective dimensions; and determining the obtained operating events in the respective dimensions corresponding to the respective field devices, and the association relationships among the operating events in the respective dimensions respectively as the characteristic data information of the corresponding field devices in the specified period of time.

Preferably the instructions are configured to obtain the respective security detecting rules corresponding to the respective field devices according to the obtained characteristic data information of the corresponding field devices in the specified period of time by:

determining the characteristic data information of the respective field devices in the specified period of time respectively as security detection criterions corresponding to the corresponding field devices, and describing the security detection criterions corresponding to the respective field devices respectively as the respective security detection rules corresponding to the respective field devices in a preset rule description pattern.

Preferably the instructions are configured to determine the respective target security detection rules corresponding to the respective field devices, and the execution devices corresponding to the respective target security detection rules according to the obtained respective security detection rules corresponding to the respective field devices by:

outputting a selection interface on which there are displayed at least the obtained respective security detection rules corresponding to the respective field devices, and identifiers of the respective execution devices corresponding to the respective field devices, and obtaining the respective target security detection rules corresponding to the respective field devices, and the execution devices corresponding to the respective target security detection rules according to detected selection operations performed on the selection interface; or selecting the respective target security detection rules corresponding to each field device from the obtained respective security detection rules corresponding to the corresponding field device under a preset rule selection condition, and allocating the corresponding execution devices respectively for the respective selected target security detection rules in a preset execution device allocation scheme.

Preferably the instructions are further configured, if an externally imported security detection rule is received, to determine the externally imported security detection rule as a target security detection rule corresponding to a field device upon determining the field device and an execution device corresponding to the externally imported security detection rule, and to issue the target security detection rule to the execution device, so that the execution device detects the corresponding field device for security under the received target security detection rule.

Advantageous effects of the embodiments of the invention are as follows:

In the embodiments of the invention, a statistical analysis can be made of the operating data information of the respective field devices in the specified period of time for the respective security detection rules corresponding to the respective field devices accurately; and the respective target security detection rules corresponding to the respective field devices are determined among the respective obtained security detection rules corresponding to the respective field devices, and then issued to the corresponding execution devices, so that unnecessary security detection rules can be eliminated to thereby filter the respective security detection rules, but also processing resources consumed by the respective execution devices in their respective security detection can be alleviated to thereby improve the efficiency of security detection. Additionally the respective target security detection rules are issued to the corresponding execution devices, so that the respective execution devices can detect the corresponding field devices for security under the received target security detection rules to thereby detect comprehensively the respective field devices so as to improve the security and reliability in the industry field, so the respective field devices in the industry field can operate in a trusted operating environment. Furthermore the respective field devices are detected in security under the respective obtained security detection rules corresponding respectively to the corresponding field devices instead of security guaranteeing mechanisms of the respective field devices to thereby avoid as much as possible the flexibility of manipulating the field devices from being degraded due to the different security guaranteeing mechanisms of the different field devices, and also lower the difficulty of managing the field devices.

DETAILED DESCRIPTION OF THE EMBODIMENTS

The technical solutions according to the embodiments of the invention will be described below clearly and fully with reference to the drawings in the embodiments of the invention, and apparently the embodiments to be described below are only a part but all of the embodiments of the invention. According to the embodiments of the invention here, all of other embodiments derived by those ordinarily skilled in the art without any inventive effort shall come into the scope of the invention.

Figure 1A:
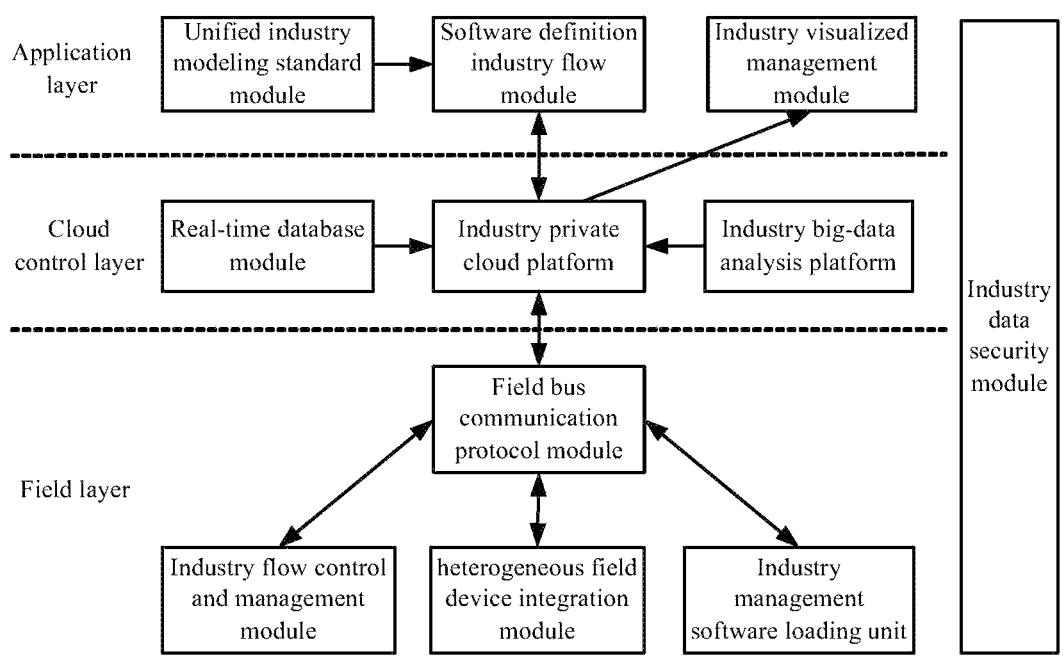
FIG. 1A illustrates a functionally architectural diagram of an industry internet operating system according to an embodiment of the invention.

In a real application, an industry internet operating system is an underlying system to enable networked industry control, cloud industry control, a visualized factory, an analysis of industry big data, etc., and also is a unified system to enable a control information flow, a management information flow, and a supply link information flow to be integrated with each other, so that the controllability of an industry field can be guaranteed. In the architectural diagram of functions in an industry internet operating system as illustrated in FIG. 1a, the industry internet operating system includes at least an application layer, a cloud control layer, and a field layer, where the application layer includes at least a unified industry modeling standard module, a software definition industry flow module, and an industry visualized management module; the cloud control layer includes at least a real-time database, an industry private cloud platform, and a industry big data analysis platform; and the field layer includes at least a field bus communication protocol module, an industry flow control and management module, a heterogeneous field device integration module, and an industry management software loading unit. Moreover the industry internet operating system further includes an industry data security module which covers the application layer, the cloud control layer, and the field layer.

The industry data security module in the prior art suffer from the problems of poor security in the industry field, and high difficulty of manipulating the respective field devices, and in order to address the problems above, in embodiments of the invention, operating data information of respective field devices in a specified period of time is analyzed respectively for characteristic data information of the respective field devices in the specified period of time, respective security detection rules corresponding to the respective field devices are determined according to the characteristic data information of the respective field devices in the specified period of time, and after respective target security detection rules corresponding to the respective field devices, and execution devices corresponding respectively to the respective target security detection rules are determined, the respective target security detection rules are issued respectively to the corresponding execution devices, so that the respective execution devices can detect the corresponding field devices for security under the received target security detection rules.

The inventive solution will be described below in details in connection with particular embodiments thereof, and of course, the invention will not be limited to the following embodiments.

Figure 1B:
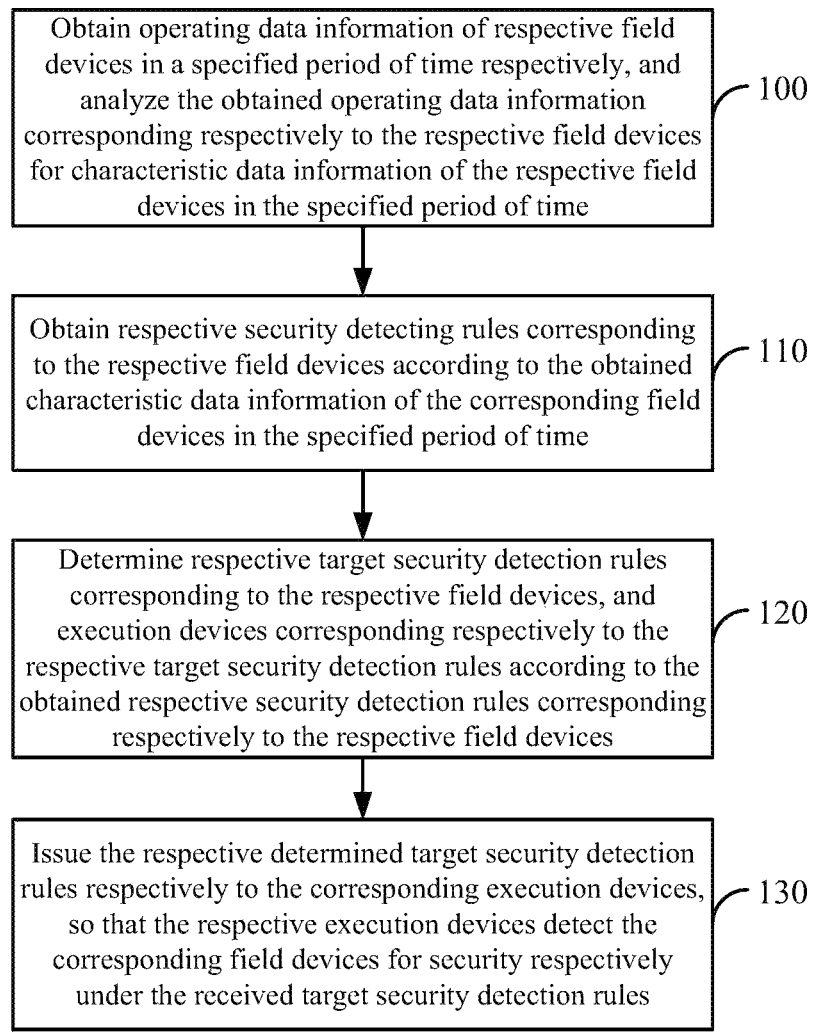
FIG. 1B is a schematic general flow chart of a method for detecting security using an industry internet operating system according to an embodiment of the invention.

In embodiments of the invention, the method for detecting security using an industry internet operating system can be applicable to an industry data security module in an industry internet operating system without any limitation thereto, and accordingly the method can be performed on a cloud server corresponding to the industry internet operating system without any limitation thereto; and moreover various heterogeneous and dispersed industry fields can be detected for security, although respective field devices in an industry field will be detected for security as described below only by way of an example. Particularly referring to FIG. 1B, a flow of the method for detecting security using an industry internet operating system is as follows:

The step 100 is to obtain operating data information of respective field devices in a specified period of time respectively, and to analyze obtained operating data information corresponding to the respective field devices to extract characteristic data information of the respective field devices in the specified period of time.

In a particular implementation, in order to enable the cloud server to obtain the operating data information of the respective field devices in the specified period of time (where the operating data information includes at least but will not be limited to communication data information, control data information, and state data information), a data acquirer can be connected in advance respectively over each field bus in the industry field, so that the data acquirer connected over each field bus acquires communication data information and control data information of respective field devices connected over the corresponding field bus (where the communication data information can include but will not be limited to transmitted data information, passed communication messages, etc.; and the control data information can include but will not be limited to received and/or issued control instructions, etc.) until a specified period of time elapses; and a data acquirer can be connected in advance respectively on each field device, so that the data acquirer connected on each field device acquires state data information of the corresponding field device (where the state data information can include but will not be limited to an operating rate, operating current, operating voltage, temperature, etc.) until a specified period of time elapses. Of course, the data acquirer connected over each field bus can alternatively acquire state data information of the respective field devices connected over the corresponding field bus, where the state data information of the respective field devices connected over each field bus is acquired in such a way that "the respective field devices connected over each field bus report their state data information to the data acquirer connected over the corresponding field bus"; and the data acquirer connected over each field device can alternatively acquire the communication data information and the control data information of the corresponding field devices; and the embodiments of the invention will be described only by way of an example where "the data acquirer connected over each field bus acquires the communication data information and the control data information of the respective field devices connected over the corresponding field bus, and the data acquirer connected over each field bus acquires the state data information of the corresponding field device".

For example, if there is a field bus, i.e., a field bus 1, in the industry field, then there will be two field devices, i.e., a field device A and a field device B, connected over the field bus 1.

A data acquirer, i.e., a data acquirer 1, is connected over the field bus 1; and a data acquirer, i.e., a data acquirer A, is connected on the field device A, and a data acquirer, i.e., a data acquirer B, is connected on the field device B.

After all the field devices (i.e., the field device A and the field device B), and all the data acquirers (i.e., the data acquirer A, the data acquirer B, and the data acquirer 1), in the industry field are powered on, the data acquirer A and the B start to operate.

The data acquirer A starts to acquire state data information of the field device A; the data acquirer B starts to acquire state data information of the field device B; and the data acquirer 1 starts to acquire communication data information and control data information of the data acquirer A and the data acquirer B until 24 hours (i.e., a specified period of time) elapses, and thereafter the data acquirer A, the data acquirer B, and the data acquirer A stop acquiring data.

Optionally the cloud server can acquire the operating data information of the respective field devices in the specified period of time in the following two implementations without any limitation thereto:

In a first implementation (where the operating data information is obtained by reporting), the data acquirer connected over the field bus reports the acquired communication data information and control data information to the cloud server at each time when the communication data information and the control data information is acquired, until the specified period of time elapses, and thereafter stops reporting the communication data information and the control data information; and the data acquirers connected on the field devices report the acquired state data information to the cloud server at each time when the state data information is acquired, until the specified period of time elapses, and thereafter stops reporting the state data information, so that the cloud server can obtain the operating data information of the respective field devices in the specified period of time according to the communication data information and the control data information reported by the data acquirer connected over each field bus, and the state data information reported by the data acquirers connected over the respective field devices. Optionally after the cloud server obtains the operating state information of the respective field devices in the specified period of time, it can further create fingerprint databases of the corresponding field devices in the specified period of time according to the obtained operating state information of the respective field devices in the specified period of time, and store the fingerprint databases of the corresponding field devices in the specified period of time respectively into a specified storage area, so that subsequently the fingerprint databases of the corresponding field devices in the specified period of time stored in the specified storage area can be analyzed in a big-data mode for the respective security detection rules corresponding to the respective field devices.

Still referring to the example above, the data acquirer A reports the acquired state data information of the field device A to the cloud server at each time when the state data information is acquired, so that the cloud server can store the received state data information into a fingerprint database A, created corresponding to the field device A, in the specified storage area according to a field device identifier "Field Device A" carried in the received state data information.

The data acquirer B reports the acquired state data information of the field device B to the cloud server at each time when the state data information is acquired, so that the cloud server can store the received state data information into a fingerprint database B, created corresponding to the field device B, in the specified storage area according to a field device identifier "Field Device B" carried in the received state data information.

The data acquirer 1 reports the acquired communication data information to the cloud server at each time when the communication data information between the field device A and the field device B is acquired, so that the cloud server can store the received communication data information respectively into the fingerprint database A, created corresponding to the field device A, and the fingerprint database B, created corresponding to the field device B, in the specified storage area according to a sending device identifier "Field Device A" and a receiving device identifier "Field Device B" carried in the received communication data information.

The data acquirer 1 reports the acquired control data information to the cloud server at each time when the control data information between the field device A and the field device B is acquired, so that the cloud server can store the received control data information respectively into the fingerprint database A, created corresponding to the field device A, and the fingerprint database B, created corresponding to the field device B, in the specified storage area according to a controlling device identifier "Field Device A" and a controlled device identifier "Field Device B" carried in the received control data information.

In this way, the state data information, the communication data information, and the control data information of the field device A in 24 hours, i.e., the operating state information of the field device A in 24 hours, is stored in the fingerprint database A corresponding to the field device A; and the state data information, the communication data information, and the control data information of the field device B in 24 hours, i.e., the operating state information of the field device B in 24 hours, is stored in the fingerprint database B corresponding to the field device B.

In a second implementation (where the operating data information is obtained in an initiative mode): the cloud server obtains the communication data information and the control data information of the respective field devices connected over corresponding field bus from the data acquirer connected over each field bus, and obtains the state data information of each field device from the data acquirer connected over the corresponding field device, upon determining that the specified period of time elapses, so that the cloud server can determine the obtained communication data information, state data information, and control data information of the respective field devices in the specified period of time respectively as the operating data information of the corresponding field devices in the specified period of time after obtaining the communication data information, the state data information, and the control data information of the respective field devices in the specified period of time. Optionally the cloud server can further create fingerprint databases of the respective field devices in the specified period of time according to the obtained operating data information of the corresponding field devices in the specified period of time, and store the fingerprint databases of the corresponding field devices in the specified period of time respectively into a specified storage area (where the specified storage area can include but will not be limited to a real-time database at the cloud control layer in the industry internet operating system), so that subsequently the fingerprint databases of the corresponding field devices in the specified period of time stored in the specified storage area can be analyzed in a big-data mode for the respective security detection rules corresponding respectively to the respective field devices.

For example, after the cloud server determines that 24 hours (i.e., the specified period of time) elapses, it obtains all the state data information acquired by the data acquirer A in 24 hours from the data acquirer A, and stores all the state data information obtained from the data acquirer A into a fingerprint database A, created corresponding to the field device A, in the specified storage area according to a pre-stored association relationship between the data acquirer A and the field device A; obtains all the state data information acquired by the data acquirer B in 24 hours from the data acquirer B, and stores all the state data information obtained from the data acquirer B into a fingerprint database B, created corresponding to the field device B, in the specified storage area according to a pre-stored association relationship between the data acquirer B and the field device B; and obtains all the communication data information and the control data information acquired by the data acquirer 1 in 24 hours from the data acquirer 1, and stores the respective pieces of communication data information and control data information respectively into the fingerprint databases of the corresponding field devices according to the sending device identifiers and the receiving device identifiers carried in the respective pieces of communication data information and control data information.

In this way, the state data information, the communication data information, and the control data information of the field device A in 24 hours, i.e., the operating state information of the field device A in 24 hours, is stored in the fingerprint database A corresponding to the field device A; and the state data information, the communication data information, and the control data information of the field device B in 24 hours, i.e., the operating state information of the field device B in 24 hours, is stored in the fingerprint database B corresponding to the field device B.

Preferably the cloud server can obtain the operating data information of the respective field devices in the specified period of time, and extract the characteristic data information of the respective field devices in the specified period of time from the obtained operating data information corresponding respectively to the respective field devices as follows without any limitation thereto: the cloud server analyzes the operating data information corresponding to the respective field devices, in a big-data mode available from the industry big-data analysis platform at the cloud control layer in the industry internet operating system, to obtain respective dimensions corresponding to the corresponding field devices, and determine operating events in the respective dimensions, and association relationships among the operating events in the respective dimensions, and determines the obtained operating events in the respective dimensions corresponding respectively to the respective field devices, and the association relationships among the operating events in the respective dimensions respectively as the characteristic data information of the corresponding field devices in the specified period of time.

For example, the cloud server categorizes all the operating data information in the fingerprint database A of the field device A, and all the operating data information in the fingerprint database B of the field device B respectively, and obtains the operating data information of the field device A in the respective dimensions, and the operating data information of the field device B in the respective dimensions, where the respective dimensions can include but will not be limited to an operating rate, operating current, operating voltage, temperature (which can include operating temperature and/ambient temperature), data transmission (which can include a transmission period of time, a sending device, a receiving device, data contents, a transmission frequency, etc.), message passing (which can include a passing period of time, a sending device, a receiving device, message contents, a passing frequency, etc.), service control (which can include a controlling device, a controlled device, control items, a control frequency, etc.), etc.

The cloud server analyzes the operating data information of the field device A in the respective dimensions, and the operating data information of the field device B in the respective dimensions respectively in a big-data mode to obtain the operating events of the field device A in the respective dimensions, and the association relationships among the operating events in the respective dimensions, and the operating events of the field device B in the respective dimensions, and the association relationships among the operating events in the respective dimensions, e.g., operating events of the field device A in the three dimensions of operating rate, operating temperature, and data transmission, where the operating event in the dimension of operating rate is that the operating rate of the field device A at the majority of points of time in 24 hours lies between 1300 rpm and 15000 rpm; the operating event of the field device A in the dimension of operating temperature is that the operating temperature of the field device A at the majority of points of time in 24 hours lies between 35 ∟ and 37 ∟ ; and the operating event of the field device A in the dimension of data transmission is that the field device A which is a sending device transmits data information L to the field device B repeatedly in 24 hours, where there is such an association relationship between the operating event in the dimension of operating rate, and the operating event in the dimension of operating temperature is that the operating temperature of the field device A rises from 35° C. to 37° C. 10 minutes after the operating rate thereof reaches 15000 rpm, etc.

The cloud server determines the obtained operating events of the field device A in the respective dimensions, and the association relationship among the operating events in the respective dimensions as the characteristic data information of the field device A in the respective dimensions, and determines the obtained operating events of the field device B in the respective dimensions, and the association relationship among the operating events in the respective dimensions as the characteristic data information of the field device B in the respective dimensions.

The step 110 is to obtain respective security detecting rules corresponding to the respective field devices according to the obtained characteristic data information of the corresponding field devices in the specified period of time.

Preferably the step 110 can be performed as follows without any limitation thereto: the cloud server determines the characteristic data information of the respective field devices in the specified period of time respectively as security detection criterions corresponding to the corresponding field devices, and describes the security detection criterions corresponding to the respective field devices respectively as the respective security detection rules corresponding to the respective field devices in a preset rule description pattern to obtain the respective security detection rules corresponding to the respective field devices.

For example, the cloud server determines the operating event in the dimension of operating rate, which is "The operating rate of the field device A at the majority of points of time in 24 hours lies between 1300 rpm and 15000 rpm" as a security detection criterion of the operating device A in the dimension of operating rate, and describes the security detection criterion in the dimension of operating rate, which is "The operating rate of the field device A at the majority of points of time in 24 hours lies between 1300 rpm and 15000 rpm" as "If the operating rate does not lie between 1300 rpm and 15000 rpm, then it will be determined that the field device A becomes abnormal" in the preset rule description pattern, so such a security detection rule of the field device A will be generated that "If the operating rate does not lie between 1300 rpm and 15000 rpm, then it will be determined that the field device A becomes abnormal".

In another example, the cloud server determines the operating event in the dimension of operating temperature, which is "The operating temperature of the field device A at the majority of points of time in 24 hours lies between 35° C. and 37° C." as a security detection criterion of the operating device A in the dimension of operating temperature, and describes the security detection criterion in the dimension of operating temperature, which is "The operating temperature of the field device A at the majority of points of time in 24 hours lies between 35° C. and 37° C." as "If the operating temperature does not lie between 35° C. and 37° C., then it will be determined that the field device A becomes abnormal" in the preset rule description pattern, so such a security detection rule of the field device A will be generated that "If the operating rate does not lie between 35° C. and 37° C., then it will be determined that the field device A becomes abnormal".

In a further example, the cloud server determines the operating event in the dimension of data transmission, which is "The operating event of the field device A in the dimension of data transmission is that the field device A which is a sending device transmits data information L to the field device B repeatedly in 24 hours" as a security detection criterion of the operating device A in the dimension of data transmission, and describes the security detection criterion in the dimension of data transmission, which is "The operating event of the field device A in the dimension of data transmission is that the field device A which is a sending device transmits data information L to the field device B repeatedly in 24 hours" as "If the field device A transmits other data information than the data information L to the field device B, then it will be determined that the field device A transmits illegal data information to the field device B" in the preset rule description pattern, so such a security detection rule of the field device A will be generated that "If the field device A transmits other data information than the data information L to the field device B, then it will be determined that the field device A transmits illegal data information to the field device B".

The step 120 is to determine respective target security detection rules corresponding to the respective field devices, and execution devices corresponding respectively to the respective target security detection rules according to the obtained respective security detection rules corresponding to the respective field devices.

Optionally the step 120 can be performed in the following two implementations without any limitation thereto:

In a first implementation, the cloud server outputs a selection interface on which there are displayed at least the obtained respective security detection rules corresponding respectively to the respective field devices, and the identifiers of the respective execution devices corresponding respectively to the respective field devices, and obtains the respective target security detection rules corresponding to the respective field devices, and the execution devices corresponding respectively to the respective target security detection rules according to detected selection operations performed on the selection interface.

For example, the cloud server outputs a selection interface on which there are displayed respective security detection rules and respective execution devices corresponding to the field device A (where the respective execution devices include at least the field device A, and a security detecting device 1 connected in advance on the field bus 1 corresponding to the field device A), and respective security detection rules and respective execution devices corresponding to the field device B (where the respective execution devices include at least the field device B, and a security detecting device 1 connected in advance on the field bus 1 corresponding to the field device B), so that an administrator of the industry internet operating system can select on the selection interface respective target security detection rules corresponding to the field device A, and execution devices corresponding respectively to the respective target security detection rules; and respective target security detection rules corresponding to the field device B, and execution devices corresponding respectively to the respective target security detection rules.

The cloud server determines the respective target security detection rules corresponding to the field device A, and the execution devices corresponding respectively to the respective target security detection rules; and the respective target security detection rules corresponding to the field device B, and the execution devices corresponding respectively to the respective target security detection rules according to the detected selection operations performed by the administrator on the selection interface.

In a second implementation, the cloud server selects the respective target security detection rules corresponding to each field device from the obtained respective security detection rules corresponding respectively to the corresponding field device according to a preset rule selection condition, and allocates the corresponding execution devices respectively for the respective selected target security detection rules in a preset execution device allocation scheme.

For example, the rule selection condition pre-configured in the cloud server is that a security detection rule including any one or combination of operating temperature, an operating rate, data transmission, and message passing is selected as a target security detection rule; and the execution device allocation scheme pre-configured in the cloud server is that if the target security detection rule is generated according to state data information of a field device, then the field device corresponding to the target security detection rule will be determined as an execution device corresponding to the target security detection rule; and if the target security detection rule is generated according to communication data information or control data information of a field device, then the field device corresponding to the target security detection rule, and/or an external security detecting device connected with the field bus of the field device will be determined as an execution device corresponding to the target security detection rule.

After the cloud server obtains the respective target security detection rules corresponding to the field device A, and the respective target security detection rules corresponding to the field device B, it can select all the security detection rules satisfying the rule selection condition from the respective security detection rules corresponding to the field device A as the respective target security detection rules corresponding to the field device A according to the rule selection condition, and allocate the corresponding execution devices respectively for the respective target security detection rules corresponding to the field device A in the execution device allocation scheme; and select all the security detection rules satisfying the rule selection condition from the respective security detection rules corresponding to the field device B as the respective target security detection rules corresponding to the field device B according to the rule selection condition, and allocate the corresponding execution devices respectively for the respective target security detection rules corresponding to the field device B in the execution device allocation scheme.

The step 130 is to issue the respective determined target security detection rules respectively to the corresponding execution devices, so that the respective execution devices detect the corresponding field devices for security respectively under the received target security detection rules.

Preferably the step 130 can be performed as follows without any limitation thereto: the cloud server packages the respective target security detection rules respectively in data packaging schemes identified by the execution devices, and issues the packaged target security detection rules to the corresponding execution devices, and the respective execution devices detect the corresponding field device for security respectively under the received target security detection rules issued by the cloud server, upon reception of the target security detection rules For example, after the cloud server determines that an execution device corresponding to the target security detection rule of the field device A, which is "If the operating rate does not lie between 1300 rpm and 15000 rpm, then it will be determined that the field device A becomes abnormal" is the field device A, it packages the target security detection rule which is "If the operating rate does not lie between 1300 rpm and 15000 rpm, then it will be determined that the field device A becomes abnormal" in a data packaging scheme identified by the field device A, and issues the packaged target security detection rule to the field device A, so that the subsequently operating field device A can determine that it becomes abnormal, upon determining that the operating rate thereof does not lie between 1300 rpm and 15000 rpm, under the target security detection rule which is "If the operating rate does not lie between 1300 rpm and 15000 rpm, then it will be determined that the field device A becomes abnormal". At this time, the field device A can stop operating.

In another example, after the cloud server determines that an execution device corresponding to the target security detection rule of the field device A, which is "If the operating temperature does not lie between 35° C. and 37° C., then it will be determined that the field device A becomes abnormal" is the field device A, it packages the target security detection rule which is "If the operating temperature does not lie between 35° C. and 37° C., then it will be determined that the field device A becomes abnormal" in a data packaging scheme identified by the field device A, and issues the packaged target security detection rule to the field device A, so that the subsequently operating field device A can determine that it becomes abnormal, upon determining that the operating temperature thereof does not lie between 35° C. and 37° C., under the target security detection rule which is "If the operating temperature does not lie between 35° C. and 37° C., then it will be determined that the field device A becomes abnormal". At this time, the field device A can stop operating.

In a further example, after the cloud server determines that an execution device corresponding to the target security detection rule of the field device A, which is "If the field device A transmits other data information than the data information L to the field device B, then it will be determined that the field device A transmits illegal data information to the field device B" is the field device A, and/or the security detecting device 1 connected over the field bus 1 of the field device A, it packages the target security detection rule which is "If the field device A transmits other data information than the data information L to the field device B, then it will be determined that the field device A transmits illegal data information to the field device B" in a data packaging scheme identified by the field device A and/or the security detecting device 1, and issues the packaged target security detection rule to the field device A and/or the security detecting device 1, so that the subsequently operating field device A and/or the security detecting device 1 can determine that it transmits illegal data information to the field device B, upon determining that the field device A transmits other data information than the data information L to the field device B, under the target security detection rule which is "If the field device A transmits other data information than the data information L to the field device B, then it will be determined that the field device A transmits illegal data information to the field device B". At this time, the field device A and/or the security detecting device 1 can stop the illegal data information from being transmitted.

It shall be noted that the cloud server can alternatively receive an externally imported security detection rule, determine the externally imported security detection rule as a target security detection rule corresponding to a field device upon determining the field device and an execution device corresponding to the externally imported security detection rule, and issue the target security detection rule to the execution device, so that the execution device detects the corresponding field device for security under the received target security detection rule, where a particular security detecting scheme is substantially the same as the detecting scheme above, so a repeated description thereof will be omitted here.

Figure 2A:
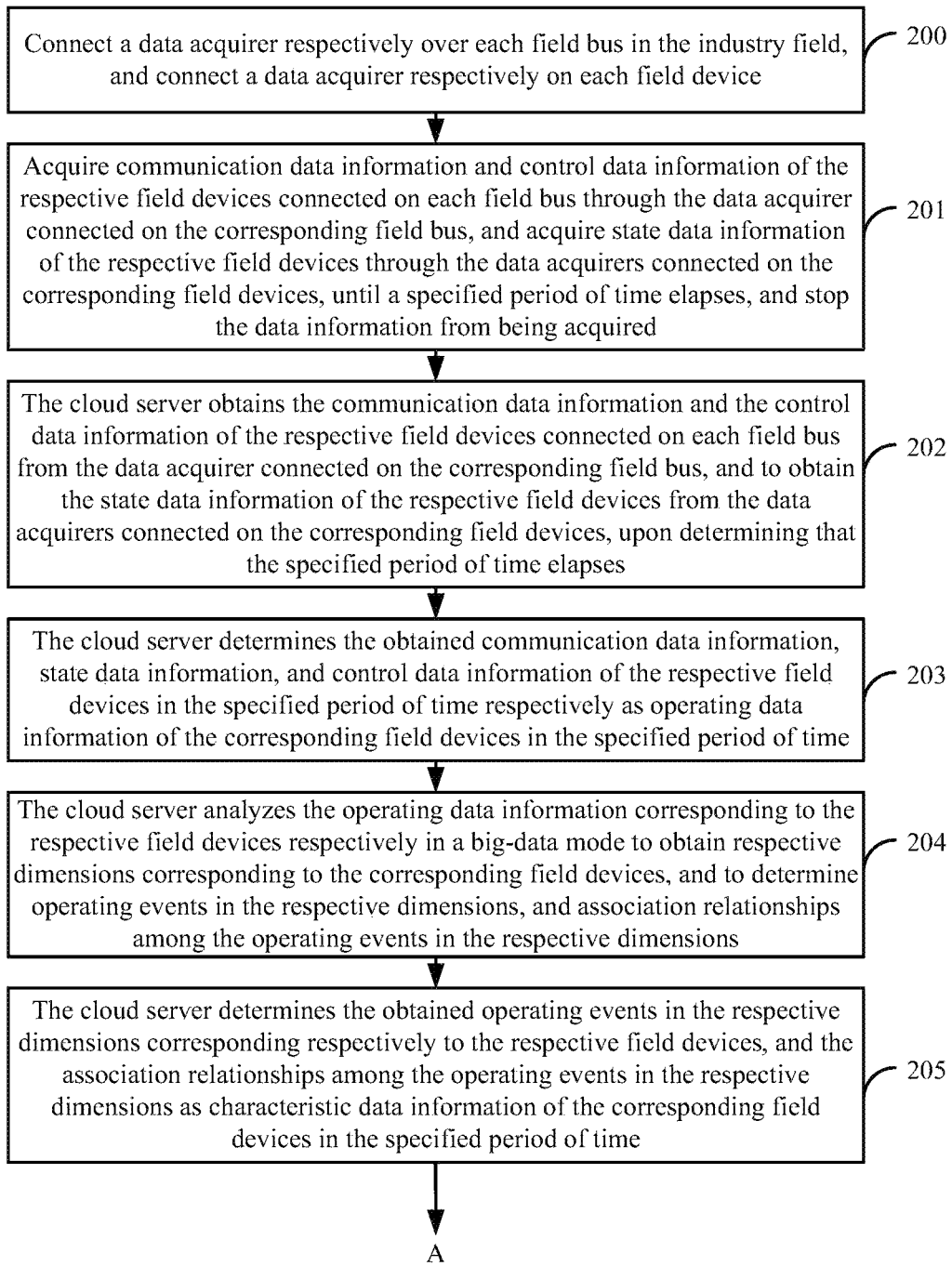
FIG. 2A and FIG. 2B are schematic detailed flow charts of a method for detecting security using an industry internet operating system according to an embodiment of the invention.
Figure 2B:
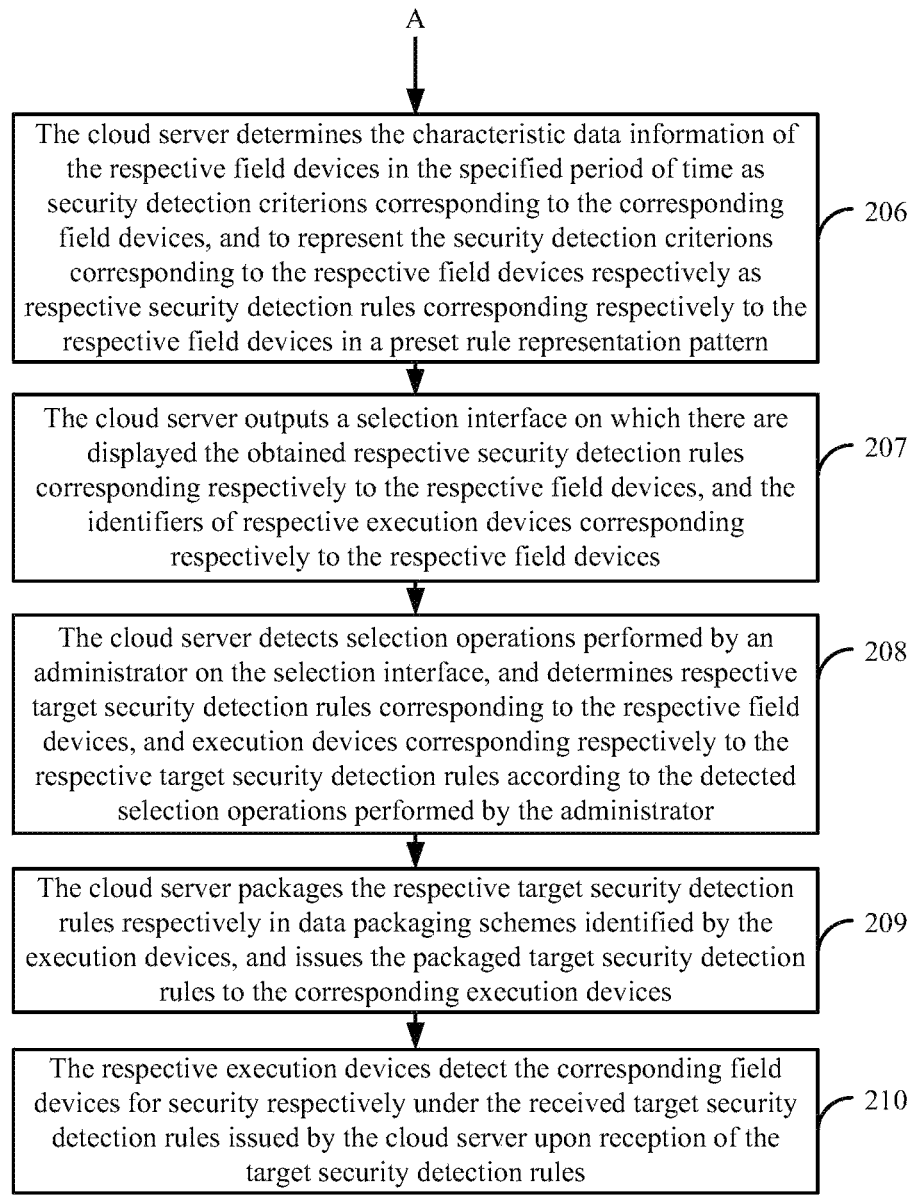

The embodiments above will be described below in further details only in a particular application scenario where "the cloud server detects each field device in an industry field for security, and the cloud server obtains on its own initiative operating data information of each field device in a specified period of time, and obtains respective target security detection rules corresponding respectively to each field device as a result of a selection operation by an administrator of the industry internet operating system", and referring to FIG. 2A and FIG. 2B, a particular flow of the method for detecting security using an industry internet operating system according to an embodiment of the invention is as follows:

The step 200 is to connect a data acquirer respectively over each field bus in the industry field, and to connect a data acquirer respectively on each field device.

The step 201 is to acquire communication data information and control data information of the respective field devices connected on each field bus through the data acquirer connected on the corresponding field bus, and to acquire state data information of the respective field devices through the data acquirers connected on the corresponding field devices, until a specified period of time elapses, and to stop acquiring the data information.

The step 202 is to obtain by the cloud server the communication data information and the control data information of the respective field devices connected on each field bus from the data acquirer connected on the corresponding field bus, and to obtain the state data information of the respective field devices from the data acquirers connected on the corresponding field devices, upon determining that the specified period of time elapses.

The step 203 is to determine by the cloud server the obtained communication data information, state data information, and control data information of the respective field devices in the specified period of time respectively as operating data information of the corresponding field devices in the specified period of time.

Preferably in order to avoid the cloud server from crashing abnormally, which would otherwise result in a loss of data information, after the step 203 is performed, the cloud server can further create fingerprint databases of the respective field devices in the specified period of time according to the obtained operating data information of the corresponding field devices in the specified period of time, and store the fingerprint databases of the respective field devices in the specified period of time respectively into a specified storage area.

The step 204 is to analyze by the cloud server the operating data information corresponding to the respective field devices respectively in a big-data mode to obtain respective dimensions corresponding to the corresponding field devices, and to determine operating events in the respective dimensions, and association relationships among the operating events in the respective dimensions.

The step 205 is to determine by the cloud server the obtained operating events in the respective dimensions corresponding respectively to the respective field devices, and the association relationships among the operating events in the respective dimensions as characteristic data information of the corresponding field devices in the specified period of time.

The step 206 is to determine by the cloud server the characteristic data information of the respective field devices in the specified period of time as security detection criterions corresponding to the corresponding field devices, and to describe the security detection criterions corresponding to the respective field devices respectively as respective security detection rules corresponding respectively to the respective field devices in a preset rule description pattern.

The step 207 is to output by the cloud server a selection interface on which there are displayed the obtained respective security detection rules corresponding respectively to the respective field devices, and the identifiers of respective execution devices corresponding respectively to the respective field devices.

The step 208 is to detect by the cloud server selection operations performed by an administrator on the selection interface, and to determine respective target security detection rules corresponding to the respective field devices, and execution devices corresponding respectively to the respective target security detection rules according to the detected selection operations performed by the administrator.

The step 209 is to package by the cloud server the respective target security detection rules respectively in data packaging schemes identified by the execution devices, and to issue the packaged target security detection rules to the corresponding execution devices.

The step 210 is to detect by the respective execution devices the corresponding field devices for security respectively under the received target security detection rules issued by the cloud server upon reception of the target security detection rules.

Figure 3:
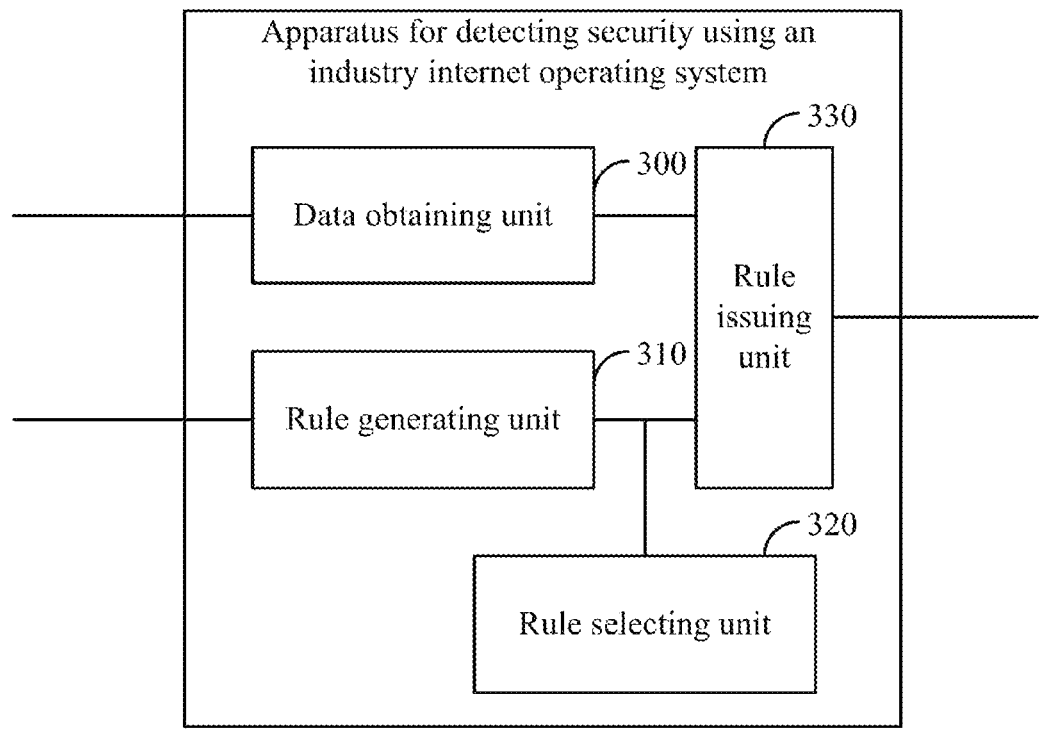
FIG. 3 is a schematic structural diagram of functions in an apparatus for detecting security using an industry internet operating system according to an embodiment of the invention.

Further to the embodiments above, referring to FIG. 3, an apparatus for detecting security using an industry internet operating system according to an embodiment of the invention (i.e., an industry data security module in the industry internet operating system) includes at least:

A data obtaining unit 300 is configured to obtain operating data information of respective field devices in a specified period of time respectively, and to extract characteristic data information of the respective field devices in the specified period of time from the obtained operating data information corresponding respectively to the respective field devices;

A rule generating unit 310 is configured to obtain respective security detecting rules corresponding to the respective field devices according to the obtained characteristic data information of the corresponding field devices in the specified period of time;

A rule selecting unit 320 is configured to determine respective target security detection rules corresponding to the respective field devices, and execution devices corresponding respectively to the respective target security detection rules according to the obtained respective security detection rules corresponding respectively to the respective field devices; and A rule issuing unit 330 is configured to issue the respective determined target security detection rules respectively to the corresponding execution devices, so that the respective execution devices detect the corresponding field devices for security respectively under the received target security detection rules.

Preferably the data obtaining unit 300 is configured to extract characteristic data information of the respective field devices in the specified period of time from the obtained operating data information corresponding respectively to the respective field devices by:

Analyzing the operating data information corresponding to the respective field devices respectively for respective dimensions corresponding to the corresponding field devices, and determining operating events in the respective dimensions, and association relationships among the operating events in the respective dimensions; and Determining the obtained operating events in the respective dimensions corresponding respectively to the respective field devices, and the association relationships among the operating events in the respective dimensions respectively as the characteristic data information of the corresponding field devices in the specified period of time.

Preferably the rule generating unit 310 is configured to obtain the respective security detecting rules corresponding to the respective field devices according to the obtained characteristic data information of the corresponding field devices in the specified period of time by:

Determining the characteristic data information of the respective field devices in the specified period of time respectively as security detection criterions corresponding to the corresponding field devices, and describing the security detection criterions corresponding to the respective field devices respectively as the respective security detection rules corresponding respectively to the respective field devices in a preset rule description pattern.

Preferably the rule selecting unit 320 is configured to determine the respective target security detection rules corresponding to the respective field devices, and the execution devices corresponding respectively to the respective target security detection rules according to the obtained respective security detection rules corresponding respectively to the respective field devices by:

Outputting a selection interface on which there are displayed at least the obtained security detection rules corresponding respectively to the respective field devices, and the identifiers of the respective execution devices corresponding to the respective field devices, and obtaining the respective target security detection rules corresponding to the respective field devices, and the execution devices corresponding to the respective target security detection rules according to detected selection operations performed on the selection interface; or Selecting the respective target security detection rules corresponding to each field device from the obtained security detection rules corresponding to the corresponding field device under a preset rule selection condition, and to allocate the corresponding execution devices for the respective selected target security detection rules in a preset execution device allocation scheme.

Preferably the rule issuing unit 330 is further configured, if an externally imported security detection rule is received, to determine the externally imported security detection rule as a target security detection rule corresponding to a field device upon determining the field device and an execution device corresponding to the externally imported security detection rule, and to issue the target security detection rule to the execution device, so that the execution device detects the corresponding field device for security under the received target security detection rule.

According to the same inventive idea, an embodiment of the invention provides a nonvolatile computer storage medium storing thereon computer executable instructions configured:

To obtain operating data information of respective field devices in a specified period of time respectively, and to extract characteristic data information of the respective field devices in the specified period of time from the obtained operating data information corresponding respectively to the respective field devices;

To obtain respective security detecting rules corresponding to the respective field devices according to the extracted characteristic data information of the corresponding field devices in the specified period of time;

To determine respective target security detection rules corresponding to the respective field devices, and execution devices corresponding to the respective target security detection rules according to the obtained respective security detection rules corresponding to the respective field devices; and To issue the respective determined target security detection rules to the corresponding execution devices, so that the respective execution devices detect the corresponding field devices for security respectively under the received target security detection rules.

Preferably the computer executable instructions are configured to extract the characteristic data information of the respective field devices in the specified period of time from the obtained operating data information corresponding to the respective field devices by:

Analyze the operating data information corresponding to the respective field devices for respective dimensions corresponding to the corresponding field devices, and determining operating events in the respective dimensions, and association relationships among the operating events in the respective dimensions; and Determining the obtained operating events in the respective dimensions corresponding to the respective field devices, and the association relationships among the operating events in the respective dimensions respectively as the characteristic data information of the corresponding field devices in the specified period of time.

Preferably the computer executable instructions are configured to obtain the respective security detecting rules corresponding to the respective field devices according to the obtained characteristic data information of the corresponding field devices in the specified period of time by:

Determining the characteristic data information of the respective field devices in the specified period of time respectively as security detection criterions corresponding to the corresponding field devices, and describing the security detection criterions corresponding to the respective field devices respectively as the respective security detection rules corresponding to the respective field devices in a preset rule description pattern.

Preferably the computer executable instructions are configured to determine the respective target security detection rules corresponding to the respective field devices, and the execution devices corresponding to the respective target security detection rules according to the obtained respective security detection rules corresponding to the respective field devices by:

Outputting a selection interface on which there are displayed at least the obtained respective security detection rules corresponding to the respective field devices, and the identifiers of the respective execution devices corresponding to the respective field devices, and obtaining the respective target security detection rules corresponding to the respective field devices, and the execution devices corresponding respectively to the respective target security detection rules according to detected selection operations performed on the selection interface; or Selecting the respective target security detection rules corresponding to each field device from the obtained security detection rules corresponding to the corresponding field device under a preset rule selection condition, and allocating the corresponding execution devices for the respective selected target security detection rules in a preset execution device allocation scheme.

Preferably the computer executable instructions are further configured, if an externally imported security detection rule is received, to determine the externally imported security detection rule as a target security detection rule corresponding to a field device upon determining the field device and an execution device corresponding to the externally imported security detection rule, and to issue the target security detection rule to the execution device, so that the execution device detects the corresponding field device for security under the received target security detection rule.

Figure 4:
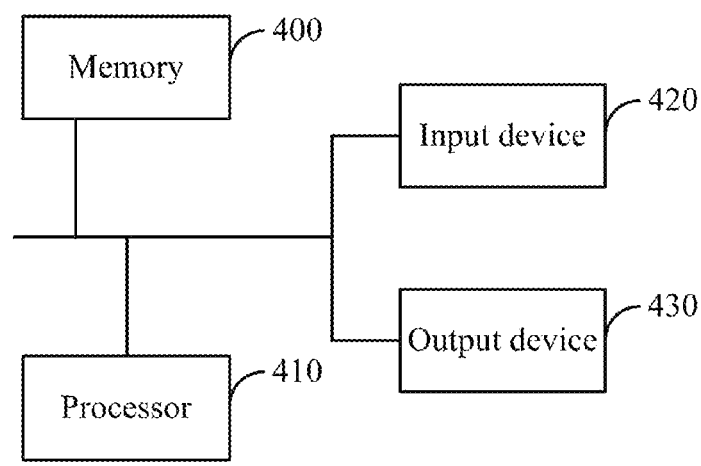
FIG. 4 is a schematic structural diagram of hardware of an electronic device in which a method for detecting security using an industry Internet operating system is performed according to an embodiment of the invention is performed.

According to the same inventive idea, referring to FIG. 4, an embodiment of the invention further provides an electronic device including at least a memory 400 and at least one processor 410 (only one processor 410 is illustrated in FIG. 4 only by way of an example), where:

The memory 400 is configured to store instructions to be executed by the at least one processor 410; and The at least one processor 410 is configured to execute the instructions stored in the memory 400: to obtain operating data information of respective field devices in a specified period of time respectively, and to extract characteristic data information of the respective field devices in the specified period of time from the obtained operating data information corresponding respectively to the respective field devices; to obtain respective security detecting rules corresponding to the respective field devices according to the obtained characteristic data information of the corresponding field devices in the specified period of time; to determine respective target security detection rules corresponding to the respective field devices, and execution devices corresponding to the respective target security detection rules according to the obtained security detection rules corresponding to the respective field devices; and to issue the respective determined target security detection rules respectively to the corresponding execution devices, so that the respective execution devices detect the corresponding field devices for security respectively under the received target security detection rules.

Preferably the electronic device further includes an input device 420 and an output device 430, where the input device 420 is configured to receive input data information, and to generate instruction information related to user setting and/or function control in the apparatus for detecting security using an industry internet operating system; and the output device 430 includes at least one display device.

Preferably the memory 400, the processor 410, the input device 420, and the output device 430 can be connected over a bus or otherwise.

Preferably the instructions are configured to extract the characteristic data information of the respective field devices in the specified period of time from the obtained operating data information corresponding respectively to the respective field devices by:

Analyzing the operating data information corresponding to the respective field devices respectively for respective dimensions corresponding to the corresponding field devices, and determining operating events in the respective dimensions, and association relationships among the operating events in the respective dimensions; and Determining the obtained operating events in the respective dimensions corresponding to the respective field devices, and the association relationships among the operating events in the respective dimensions respectively as the characteristic data information of the corresponding field devices in the specified period of time.

Preferably the instructions are configured to obtain the respective security detecting rules corresponding to the respective field devices according to the obtained characteristic data information of the corresponding field devices in the specified period of time by:

Determining the characteristic data information of the respective field devices in the specified period of time respectively as security detection criterions corresponding to the corresponding field devices, and describing the security detection criterions corresponding to the respective field devices respectively as the respective security detection rules corresponding to the respective field devices in a preset rule description pattern.

Preferably the instructions are configured to determine the respective target security detection rules corresponding to the respective field devices, and the execution devices corresponding to the respective target security detection rules according to the obtained respective security detection rules corresponding respectively to the respective field devices by:

Outputting a selection interface on which there are displayed at least the obtained security detection rules corresponding to the respective field devices, and the identifiers of the respective execution devices corresponding to the respective field devices, and obtaining the respective target security detection rules corresponding to the respective field devices, and the execution devices corresponding to the respective target security detection rules according to detected selection operations performed on the selection interface; or Selecting the respective target security detection rules corresponding to each field device from the obtained security detection rules corresponding to the corresponding field device under a preset rule selection condition, and allocating the corresponding execution devices respectively for the respective selected target security detection rules in a preset execution device allocation scheme.

Preferably the instructions are further configured, if an externally imported security detection rule is received, to determine the externally imported security detection rule as a target security detection rule corresponding to a field device upon determining the field device and an execution device corresponding to the externally imported security detection rule, and to issue the target security detection rule to the execution device, so that the execution device detects the corresponding field device for security under the received target security detection rule.

The electronic device according to embodiments of the invention can be embodied in a number of forms including but not limited to:

(1) A mobile communication device which is characterized in that it possesses a mobile communication function, and primarily aims to provide voice and data communication. Such a terminal includes a smart mobile phone, (e.g., iPhone), a multimedia mobile phone, a functional mobile phone, a low-end mobile phone, etc.

(2) An ultra-mobile personal computer device which falls into the domain of personal computers, and which possesses computing and processing functions, and generally also a mobile access to the Internet. Such a terminal includes a PDA (Personal Digital Assistant), an MID (Mobile Internet Device), a UMPC (Ultra-Mobile Personal Computer), or the like, e.g., iPad.

(3) A portable entertainment device which can display and play multimedia contents. Such a device includes an audio or video player (e.g., iPod), a palm game console, an electronic book, a smart toy, a portable on-vehicle navigation device, etc.

(4) A server which is a device providing a computing service, and which includes a processor, a hard disk, a memory, a system bus, etc., where the server is similar in architecture to a general-purpose computer, but is required to possess a higher processing capacity, higher stability, reliability, security, extensibility, manageability, etc., in order to provide the service more reliably.

(5) Other electronic devices capable of exchanging data.

In summary, in the embodiments of the invention, operating data information of respective field devices in a specified period of time respectively is obtained, and the obtained operating data information corresponding respectively to the respective field devices is analyzed for characteristic data information of the respective field devices in the specified period of time; respective security detecting rules corresponding to the respective field devices are obtained according to the obtained characteristic data information of the corresponding field devices in the specified period of time; respective target security detection rules corresponding to the respective field devices, and execution devices corresponding respectively to the respective target security detection rules are determined according to the obtained respective security detection rules corresponding respectively to the respective field devices; and the respective determined target security detection rules are issued respectively to the corresponding execution devices, so that the respective execution devices detect the corresponding field devices for security respectively under the received target security detection rules. In this way a statistical analysis can be made of the operating data information of the respective field devices in the specified period of time for the respective security detection rules corresponding respectively to the respective field devices accurately; and the respective target security detection rules corresponding to the respective field devices are determined among the respective obtained security detection rules corresponding respectively to the respective field devices, and then issued to the corresponding execution devices, so that unnecessary security detection rules can be eliminated to thereby filter the respective security detection rules, but also processing resources consumed by the respective execution devices in their respective security detection can be alleviated to thereby improve the efficiency of security detection. Additionally the respective target security detection rules are issued to the corresponding execution devices, so that the respective execution devices can detect the corresponding field devices for security under the received target security detection rules to thereby detect comprehensively the respective field devices so as to improve the security and reliability in the industry field, so the respective field devices in the industry field can operate in a trusted operating environment. Furthermore the respective field devices are detected for detection under the respective obtained security detection rules corresponding respectively to the corresponding field devices instead of security guaranteeing mechanisms of the respective field devices to thereby avoid as much as possible the flexibility of manipulating the field devices from being degraded due to the different security guaranteeing mechanisms of the different field devices, and also lower the difficulty of managing the field devices.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for detecting security using an industry internet operating system, the method comprises:
   obtaining operating data information of respective field devices in a specified period of time respectively;
   analyzing the operating data information corresponding to the respective field devices respectively to obtain respective dimensions corresponding to the field devices, and determining operating events in the respective dimensions, and association relationships among the operating events in the respective dimensions;
   determining the obtained operating events in the respective dimensions corresponding to the respective field devices, and the association relationships among the operating events in the respective dimensions respectively as a characteristic data information of the corresponding field devices in the specified period of time;
   obtaining respective security detecting rules corresponding to the respective field devices according to obtained characteristic data information of the corresponding field devices in the specified period of time;
   determining respective target security detection rules corresponding to the respective field devices, and execution devices corresponding to the respective target security detection rules according to the obtained respective security detection rules corresponding respectively to the respective field devices; and
   issuing the respective determined target security detection rules respectively to the corresponding execution devices, so that the respective execution devices detect the corresponding field devices for security respectively under the received target security detection rules.

2. The method according to claim 1, wherein the obtaining the respective security detecting rules corresponding to the respective field devices according to the obtained characteristic data information of the corresponding field devices in the specified period of time comprises:
   determining the characteristic data information of the respective field devices in the specified period of time respectively as security detection criterions corresponding to the field devices, and describing the security detection criterions corresponding to the respective field devices respectively as the respective security detection rules corresponding to the respective field devices in a preset rule description pattern.

3. The method according to claim 2, wherein the method further comprises: if an externally imported security detection rule is received, then determining the externally imported security detection rule as a target security detection rule corresponding to a field device upon determining the field device and an execution device corresponding to the externally imported security detection rule, and issuing the target security detection rule to the execution device, so that the execution device detects the corresponding field device for security under the received target security detection rule.

4. The method according to claim 1, wherein the determining the respective target security detection rules corresponding to the respective field devices, and the execution devices corresponding to the respective target security detection rules according to the obtained respective security detection rules corresponding to the respective field devices comprises:
   outputting a selection interface on which there are displayed at least the obtained respective security detection rules corresponding to the respective field devices, and identifiers of the respective execution devices corresponding to the respective field devices, and obtaining the respective target security detection rules corresponding to the respective field devices, and the execution devices corresponding to the respective target security detection rules according to detected selection operations performed on the selection interface; or
   selecting the respective target security detection rules corresponding to each field device from the obtained respective security detection rules corresponding to the field device under a preset rule selection condition, and allocating the execution devices respectively for the respective selected target security detection rules in a preset execution device allocation scheme.

5. The method according to claim 4, wherein the method further comprises: if an externally imported security detection rule is received, then determining the externally imported security detection rule as a target security detection rule corresponding to a field device upon determining the field device and an execution device corresponding to the externally imported security detection rule, and issuing the target security detection rule to the execution device, so that the execution device detects the corresponding field device for security under the received target security detection rule.

6. The method according to claim 1, wherein the method further comprises: if an externally imported security detection rule is received, then determining the externally imported security detection rule as a target security detection rule corresponding to a field device upon determining the field device and an execution device corresponding to the externally imported security detection rule, and issuing the target security detection rule to the execution device, so that the execution device detects the corresponding field device for security under the received target security detection rule.

7. The method according to claim 1, wherein the method further comprises: if an externally imported security detection rule is received, then determining the externally imported security detection rule as a target security detection rule corresponding to a field device upon determining the field device and an execution device corresponding to the externally imported security detection rule, and issuing the target security detection rule to the execution device, so that the execution device detects the corresponding field device for security under the received target security detection rule.

8. An apparatus for detecting security using an industry internet operating system, the apparatus comprises: a memory configured to store a non-transitory computer readable program, and at least one processor configured to execute the computer readable program to:
   obtain operating data information of respective field devices in a specified period of time respectively;
   analyze the operating data information corresponding to the respective field devices respectively for respective dimensions corresponding to the field devices, and determine operating events in the respective dimensions, and association relationships among the operating events in the respective dimensions;

determine obtained operating events in the respective dimensions corresponding to the respective field devices, and the association relationships among the operating events in the respective dimensions respectively as the characteristic data information of the corresponding field devices in the specified period of time;

obtain respective security detecting rules corresponding to the respective field devices according to obtained characteristic data information of the corresponding field devices in the specified period of time;

determine respective target security detection rules corresponding to the respective field devices, and execution devices corresponding to the respective target security detection rules according to the obtained respective security detection rules corresponding to the respective field devices; and issue respective determined target security detection rules respectively to the execution devices, so that the execution devices detect the corresponding field devices for security respectively under received target security detection rules.

9. The apparatus according to claim 8, wherein the at least one processor is configured to execute the computer readable program to obtain the respective security detecting rules corresponding to the respective field devices according to the obtained characteristic data information of the corresponding field devices in the specified period of time by:

determining the characteristic data information of the respective field devices in the specified period of time respectively as security detection criterions corresponding to the field devices, and describing the security detection criterions corresponding to the respective field devices respectively as the security detection rules corresponding to the respective field devices in a preset rule description pattern.

10. The apparatus according to claim 9, wherein the at least one processor is configured to execute the computer readable program to, if an externally imported security detection rule is received, determine the externally imported security detection rule as a target security detection rule corresponding to a field device upon determining the field device and an execution device corresponding to the externally imported security detection rule, and issue the target security detection rule to the execution device, so that the execution device detects the corresponding field device for security under the received target security detection rule.

11. The apparatus according to claim 8, wherein the at least one processor is configured to execute the computer readable program to determine the respective target security detection rules corresponding to the respective field devices, and the execution devices corresponding to the respective target security detection rules according to the obtained respective security detection rules corresponding to the respective field devices by:

outputting a selection interface on which there are displayed at least the obtained respective security detection rules corresponding to the respective field devices, and identifiers of the respective execution devices corresponding to the respective field devices, and obtaining the respective target security detection rules corresponding to the respective field devices, and the execution devices corresponding to the respective target security detection rules according to detected selection operations performed on the selection interface; or selecting the respective target security detection rules corresponding to each field device from the obtained respective security detection rules corresponding to the corresponding field device under a preset rule selection condition, and allocating the corresponding execution devices respectively for the respective selected target security detection rules in a preset execution device allocation scheme.

12. The apparatus according to claim 11, wherein the at least one processor is configured to execute the computer readable program to, if an externally imported security detection rule is received, determine the externally imported security detection rule as a target security detection rule corresponding to a field device upon determining the field device and an execution device corresponding to the externally imported security detection rule, and issue the target security detection rule to the execution device, so that the execution device detects the corresponding field device for security under the received target security detection rule.

13. The apparatus according to claim 8, wherein the at least one processor is configured to execute the computer readable program to, if an externally imported security detection rule is received, determine the externally imported security detection rule as a target security detection rule corresponding to a field device upon determining the field device and an execution device corresponding to the externally imported security detection rule, and issue the target security detection rule to the execution device, so that the execution device detects the corresponding field device for security under the received target security detection rule.

14. The apparatus according to claim 8, wherein the at least one processor is configured to execute the computer readable program to, if an externally imported security detection rule is received, determine the externally imported security detection rule as a target security detection rule corresponding to a field device upon determining the field device and an execution device corresponding to the externally imported security detection rule, and issue the target security detection rule to the execution device, so that the execution device detects the corresponding field device for security under the received target security detection rule.

* * * * *